Patented Nov. 13, 1928.

1,691,660

UNITED STATES PATENT OFFICE.

CARL KRAUSS, OF LEVERKUSEN-ON-THE-RHINE, GERMANY, ASSIGNOR TO GRASSELLI DYESTUFF CORPORATION, OF NEW YORK, N. Y., A CORPORATION OF DELAWARE.

VAT DYESTUFFS OF THE 2.2'-INDOLE-THIONAPHTHENE-INDIGO SERIES.

No Drawing. Application filed June 11, 1927, Serial No. 198,306, and in Germany June 15, 1926.

My present invention relates to new vat dyestuffs of the 2.2'-indole-thionaphthene-indigo series.

I have found that by brominating dyestuffs of the general formula:

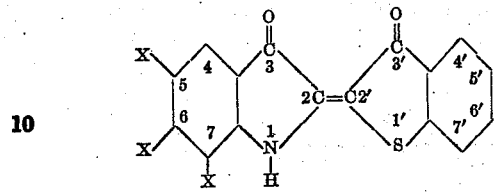

wherein one X stands for an alkyl-group and the other two X's for hydrogen, in sulfuric acid by means of bromine in quantities, which suffice to cause the substitution of two bromine atoms, new valuable dyestuffs are obtained which dye beautiful clear violet shades of good properties as to fastness. Probably they correspond to the formula:

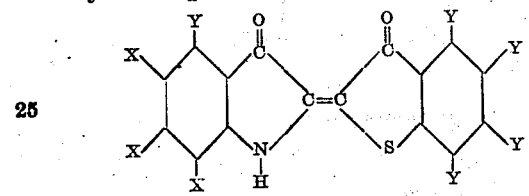

wherein one X stands for an alkyl-group, the other two X's and Y's stand for hydrogen, except for two which are bromine. I wish it to be understood that the position of the bromine atoms is not certain. Probably one bromine atom is standing in the benzene nucleus of the indigo residue, the other bromine atom in the benzene nucleus of the thionaphthene residue.

For the brominating process I prefer to use a temperature of about 10–15° C. while adding the bromine to the sulfuric-acid-solution of the 2.2'-indole-thionaphthene-indigo-compound and then to raise slowly the temperature to about 40–50° C.

The invention is illustrated by the following example, without limiting it thereto:

40 parts by weight of bromine are added with stirring to a solution of 30 parts by weight of 7-methyl-2.2'-indole-thionaphthene-indigo in 480 parts by weight of 96% sulfuric acid at from 10°–15° C., after which stirring is continued for about 10 hours. The temperature is then raised by 5° per hour with continued stirring, until a temperature of 40° C. is attained, which is maintained for another hour, after which the whole is poured into water, stirred thoroughly, filtered off, washed and dried. The yield amounts to about 45 parts by weight of dry dyestuff, which is shown by analysis to be a dibromo derivative.

The new dyestuff is presumed to have the following formula:

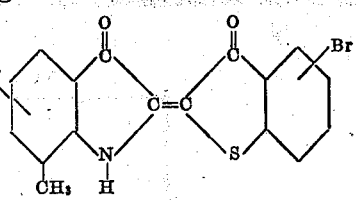

It is in a dry state a violet powder soluble in concentrated sulfuric acid with greenish-blue color.

In an exactly similar manner, for example, dibromo-6-metyl- and dibromo-5-methyl-2.2'-indole thionaphthene-indigo can be produced.

The dibromomethyl-2.2'-indole thionaphthene indigos dye the animal and vegetable fibre from a yellow vat beautiful clear violet shades of good fastness to chlorine, to boiling and to light.

I claim:

1. The new dyestuffs corresponding probably to the general formula:

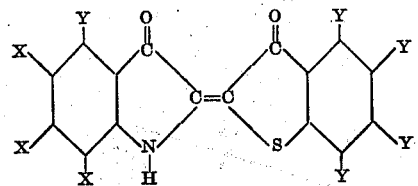

wherein one X stands for an alkyl-group, the other two X's and Y's stand for hydrogen, except for two which are bromine, which are in a dry state violet powders soluble in concentrated sulfuric acid with greenish-blue color dyeing the animal and vegetable fibre from a yellow vat beautiful clear violet shades of good fastness to chlorine, to boiling, and to light, and which are obtainable by brominating dyestuffs of the general formula:

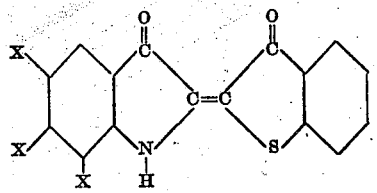

wherein one X stands for an alkyl-group, and the other two X's for hydrogen in sulfuric acid by means of bromine in quantities which suffice to cause the substitution of two bromine atoms.

2. The new dyestuffs corresponding probably to the general formula:

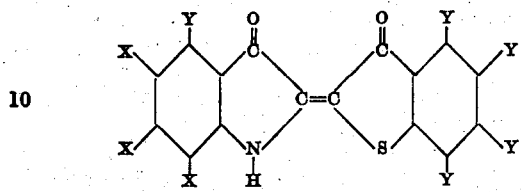

wherein one X stands for a methyl-group, the other two X's and Y's stand for hydrogen, except for two which are bromine, which are in a dry state violet powders soluble in concentrated sulfuric acid with greenish-blue color dyeing the animal and vegetable fibre from a yellow vat beautiful clear violet shades of good fastness to chlorine, to boiling and to light.

3. The new dyestuff having probably the formula

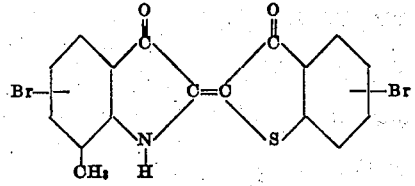

which is in a dry state a violet powder soluble in concentrated sulfuric acid with greenish-blue color dyeing the animal and vegetable fibre from a yellow vat beautiful clear violet shades of good fastness to chlorine, to boiling and to light.

In testimony whereof I have hereunto set my hand.

CARL KRAUSS.